B. F. BLAKELY.
Machines for Cutting Marble.
No. 146,306.          Patented Jan. 13, 1874.
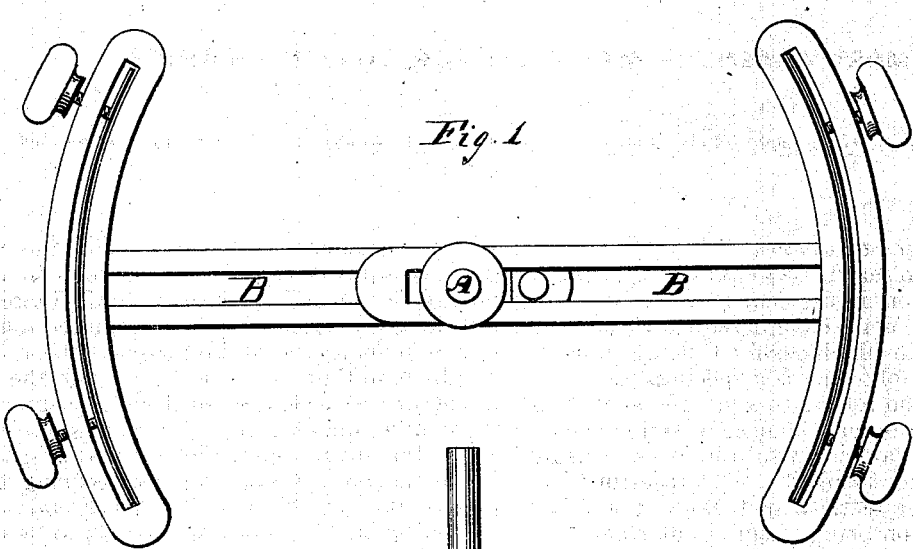
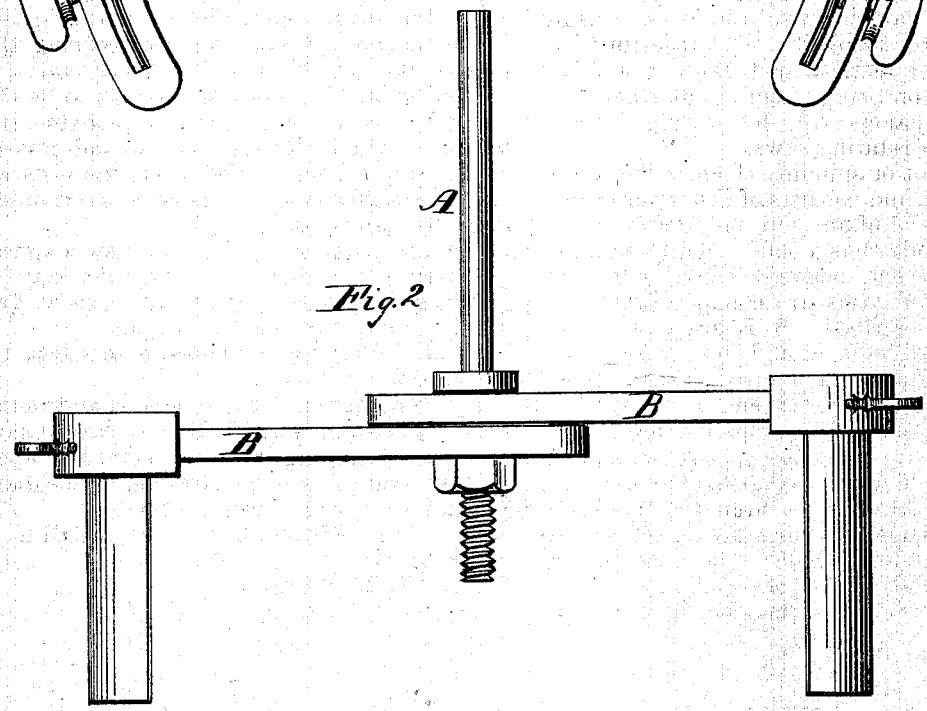
Witnesses.                Inventor.
Wm H Samuell          Benjamin F Blakely.
Wm L. Griswold

UNITED STATES PATENT OFFICE.

BENJAMIN F. BLAKELY, OF BINGHAMTON, NEW YORK.

IMPROVEMENT IN MACHINES FOR CUTTING MARBLE.

Specification forming part of Letters Patent No. 146,306, dated January 13, 1874; application filed June 24, 1873.

*To all whom it may concern:*

Be it known that I, BENJAMIN F. BLAKELY, of Binghamton, in the county of Broome and State of New York, have invented certain Improvements in Machines for Cutting Marble, of which the following is a specification:

My invention relates to a manner of cutting circular holes in marble or stone slabs, or such substances as are cut with iron saws by using sand and water therewith, or by inserting diamond or other teeth in such saws; the object of my invention being to cut circular holes for wash-sinks, panels, &c., by sawing directly through with rotating saws.

A is a pivot or spindle, which is the center of the device, and consists of a stem or shank, to enter the end of any suitable shaft to rotate it. The spindle has a solid collar, and a nut on the lower end, between which collar and nut two slotted arms are clamped, which are hereinafter described. B B are two slotted arms on the spindle A, and are securely fastened thereto by being held against the collar by the nut on the lower end of the spindle. On the outer ends of the arms B B are curved heads, each arm being the radius of its head, and the spindle A is the center. These curved heads have vertical slots through them nearly their whole length, in which are placed square pieces of plate-iron, which act as saws, and extend far enough below the heads to act upon the marble, the saws thus being short, and form two segments of the circle which the machine is adjusted to cut. Set-screws in the sides of the heads hold the saws firmly therein, and these are adjusted to the required diameter by moving the slotted arms B B on the spindle A so that each saw will be half the diameter of the circle desired from the center of the spindle, and screwing them against the collar by the nut to retain them in that position.

The machine is operated by securing the stem of the spindle A in the lower end of a vertical shaft, and placing the slab to be cut under it. Motion is given to the machine, the shaft is gradually lowered or the slab raised, sand and water are applied where the saws act upon the marble, and the pressure is continued until the slab is cut through.

I do not claim the use of any new material for marble-saws, nor any particular kind of grinding substance, such as sand, emery, &c., in connection with such saws; but What I do claim, and desire to secure by Letters Patent, is—

The combination of the spindle A and radial slotted adjustable arms B B, with curved slotted heads, carrying saws in segments, when these several parts are constructed in the manner and operate as herein set forth.

BENJAMIN F. BLAKELY.

Witnesses:
WM. H. SERRILL,
WM. L. GRISWOLD.